(12) United States Patent
Flury et al.

(10) Patent No.: US 8,396,175 B2
(45) Date of Patent: Mar. 12, 2013

(54) METHOD FOR ESTIMATING AND CORRECTING A DRIFT BETWEEN CLOCKS OF RECEIVING TRANSCEIVER AND A CORRESPONDING EMITTING TRANSCEIVER, AND RECEIVE FOR IMPLEMENTING SAID METHOD

(75) Inventors: Manuel Flury, Lausanne (CH); Ruben Merz, Berlin (DE); Jean-Yves Le Boudec, Jouxtens-Mézery (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 344 days.

(21) Appl. No.: 12/874,052

(22) Filed: Sep. 1, 2010

(65) Prior Publication Data

US 2011/0051847 A1   Mar. 3, 2011

(30) Foreign Application Priority Data

Sep. 1, 2009 (EP) ..................... 09169176

(51) Int. Cl.
*H04L 27/06* (2006.01)
*H04L 5/16* (2006.01)
*H04L 27/08* (2006.01)

(52) U.S. Cl. ............ 375/345; 375/220; 375/346

(58) Field of Classification Search ............. 375/220, 375/285, 316, 346, 345
See application file for complete search history.

(56) References Cited

U.S. PATENT DOCUMENTS

| 3,069,654 A | 12/1962 | Hough |
| 6,335,949 B1 | 1/2002 | Kim |
| 7,613,257 B2 | 11/2009 | El Fawal et al. |
| 2006/0093077 A1 | 5/2006 | El Fawal et al. |
| 2006/0158358 A1 | 7/2006 | Seo et al. |

(Continued)

FOREIGN PATENT DOCUMENTS

| WO | WO 01/76086 | 10/2001 |
| WO | WO 02/32008 | 4/2002 |

(Continued)

OTHER PUBLICATIONS

Manuel Flury et al., "Performance evaluation of an ieee 802.15.4a physical layer with energy detection and multi-user interference," IEEE International Conference on Ultra Wideband 2007, Sep. 2007, pp. 663-668.

(Continued)

*Primary Examiner* — Ted Wang
*Assistant Examiner* — Janice Tieu
(74) *Attorney, Agent, or Firm* — DLA Piper LLP US

(57) ABSTRACT

Method for estimating and correcting a frequency offset between a local clock of a receiving transceiver and a remote clock of an emitting transceiver comprises receiving by said receiving transceiver, a signal emitted by the emitting transceiver, said signal lacking a continuous sinusoidal carrier and having at least one symbol, each symbol being emitted within a time frame having a first duration; sampling the signal by taking for each time frame a set of energy measurements of said signal; forming a matrix representative of said energy measurements; determining from said energy matrix, points of maximum of energy within each time frame; determining a line connecting a plurality of said points within each of said time frames; determining a slope of said line; calculating a frequency offset between the clocks of the emitting and receiving transceivers using the slope; and adjusting the receiving transceiver's clock frequency according to the frequency offset.

32 Claims, 5 Drawing Sheets

U.S. PATENT DOCUMENTS

| | | | |
|---|---|---|---|
| 2006/0274820 A1* | 12/2006 | Walton et al. | 375/148 |
| 2007/0127600 A1 | 6/2007 | Sato et al. | |
| 2007/0133699 A1* | 6/2007 | Roh et al. | 375/260 |
| 2008/0069260 A1 | 3/2008 | Wellig | |
| 2009/0075590 A1 | 3/2009 | Sahinoglu et al. | |
| 2010/0266004 A1* | 10/2010 | Aoki et al. | 375/226 |

FOREIGN PATENT DOCUMENTS

| | | |
|---|---|---|
| WO | WO 02/101942 | 12/2002 |
| WO | WO 2005/074150 | 8/2005 |
| WO | WO 2006/112846 | 10/2006 |
| WO | WO 2006/112850 | 10/2006 |
| WO | WO 2007/011357 | 1/2007 |
| WO | WO 2007/018133 | 2/2007 |
| WO | WO 2009/098652 | 8/2009 |

OTHER PUBLICATIONS

Fred S. Lee et al., "A 2.5nj/b 0.65v 3-to-5ghz subbanded UWB receiver in 90nm CMOS," in ISSCC 07, Feb. 2007, pp. 116-117, and 590.

Martin Weisenhorn et al., "Robust Noncoherent Receiver Exploiting UWB Channel Properties," International Workshop on Ultra Wideband Systems 2004, Joint Conference on Ultrawideband Systems and Technologies. Joint UWBST & IWUWBS, May 2004, pp. 156-160.

Mustafa E. Sahin, et al., "Optimization of Energy Detector Receivers for UWB Systems," in IEEE Spring VTC 05, vol. 2, 5 pages (2005).

Majid A. Nemati et al., "Optimum Integration Time for UWB Transmitted Reference and Energy Detector Receivers," in IEEE MILCOM 06, Oct. 2006, pp. 1-7.

Zhi Tian et al., "Weighted Energy Detection of Ultra-Wideband Signals," in IEEE SPAWC 05, Jun. 2005, pp. 1068-1072.

Martin Weisenhorn et al., "ML Receiver for Pulsed UWB Signals and Partial Channel State Information", IEEE International Conference on Ultra-Wideband, 2005, pp. 180-185.

Antonio A. D'Amico et al., "Energy-Detection UWB Receivers with Multiple Energy Measurements," IEEE Trans. Wireless Commun., vol. 6, No. 7, pp. 2652-2659, Jul. 2007.

Chunjie Duan et al., "A Non-Coherent 802.15.4a UWB Impulse Radio," IEEE International Conference on Ultra-Wideband 2007, Sep. 2007, pp. 146-151.

Arthur D. Spaulding et al., "Optimum Reception in an Impulsive Interference Environment—Part I: Coherent Detection," IEEE Trans. Commun., vol. 25, No. 9, pp. 910-923, Sep. 1977.

Saleem A. Kassam et al., "Robust Signal Processing for Communication Systems," IEEE Commun. Mag., vol. 21, No. 1, pp. 20-28, Jan. 1983.

Raymond Knopp et al., "Achievable Rates for UWB Peer-to-Peer Networks," Int. Zurich Seminar on Communications (IZS), Feb. 18-20, 2004, pp. 82-85.

Ruben Merz et al., "A Joint PHY/MAC Architecture for Low-Radiated Power TH-UWB Wireless Ad-Hoc Networks," Wireless Communications and Mobile Computing Journal, Special Issue on Ultrawideband (UWB) Communications, vol. 5, No. 5, pp. 567-580, Aug. 2005.

Manuel Flury et al., "Interference Mitigation by Statistical Interference Modeling in an Impulse Radio UWB Receiver," The 2006 IEEE 2006 International Conference on Ultra-Wideband, Sep. 2006, pp. 393-398.

Norman C. Beaulieu et al., "An Adaptive Threshold Soft-Limiting UWB Receiver with Improved Performance in Multiuser Interference", The 2006 IEEE 2006 International Conference on Ultra-Wideband, 2006, pp. 405-410.

Jeebak Mitra et al., "Robust Detectors for TH IR-UWB Systems with Multiuser Interference," IEEE International Conference on Ultra-Wideband, 2007. ICUWB 2007, Sep. 2007, pp. 745-750.

International Search Report issued in PCT/IB2009/050468, mailed Jun. 2, 2009.

Written Opinion issued in PCT/IB2009/050468, mailed Jun. 2, 2009.

Image File History of U.S. Appl. No. 12/865,521.

European Search Report Issued in EP 09 16 9176, issued May 3, 2010.

Zafer Sahinoglu et al., "Multiuser Interface Mitigation in Noncoherent UWB Ranging via Nonlinear Filtering", EURSIP Journal of Wireless Communication and Networking, vol. 2006, Article ID 56849, pp. 1-10 (2006).

Cecilia Carbonelli et al., "M-PPM Noncoherent Receivers for UWB Applications", IEEE Transactions on Wireless Communications, vol. 5, No. 8, pp. 2285-2294 (Aug. 2006).

Davide Dardari et al., "Time-of-Arrival Estimation of UWB Signals in the Presence of Narrowband and Wideband Interference", IEEE International Conference on Ultra-Wideband 2007, pp. 71-76 (2007).

Ricard O. Duda et al., "Use of the Hough Transformation to Detect Lines and Curves in Pictures", Communications of the ACM, vol. 15, No. 1, pp. 11-15 (Jan. 1972).

A. Wellig et al., "Trellis-Based Maximum-Likelihood Crystal Drift Estimator for Ranging Applications in UWB-LDR", IEE International Conference on Ultra-Wideband 2006, pp. 539-544 (2006).

Alaeddine El Fawal et al., "A Robust Signal Detection method for Ultra Wide Bande (UWB) Networks with Uncontrolled Interference", IEEE Transactions on Microwave Theory and Techniques (MTT), vol. 54, No. 4, part 2, pp. 1769-1781 (2006).

Manuel Flury et al., "An Energy Detection Receiver Robust to Multi-User Interferecne for IEEE 802.15.4a Networks", International Conference on Ultra-Wideband (ICUWB 2008), Sep. 10-12, 2008 (4 pages).

"802,15.4: IEEE Standard for Information Technology—Telecommunication and Information Exchange Between Systems—Local and Metropolitan Area Networks—Specific Requirements; Part 15.4: Wireless Medium Access Control (MAC) and Physical Layer (PHY) Specifications for Low-Rate Wireless Personal Area Networks (WPANs)"; IEEE Computer Society; pp. iii-xvi, and 1-305; Sep. 8, 2006.

"802.15.4a: IEEE Standard for Information Technology—Telecommunication and Information Exchange Between Systems—Local and Metropolitan Area Networks—Specific Requirements; Part 15.4: Wireless Medium Access Control (MAC) and Physical Layer (PHY) Specifications for Low-Rate Wireless Personal Area Networks (WPANs); Amendment 1: Add Alternate PHYs"; IEEE Computer Society; pp, iv-xiv, and 1-187; Aug. 31, 2007.

G.Y. Chen et al., "Invariant Radon-Wavelet Packet Signatures for Pattern Recognition", IEEE CCECE/CCGEI, Ottawa, pp. 1471-1474 (May 2006).

* cited by examiner

METHOD FOR ESTIMATING AND CORRECTING A DRIFT BETWEEN CLOCKS OF RECEIVING TRANSCEIVER AND A CORRESPONDING EMITTING TRANSCEIVER, AND RECEIVE FOR IMPLEMENTING SAID METHOD

CLAIM TO PRIORITY

This application claims priority under 35 U.S.C. Section 119(a) to European patent application no. EP09169176.6, the entire contents of which are hereby incorporated herein by reference.

TECHNICAL FIELD

The present invention relates to a clock offset tracking and synchronization method suitable for low-complexity receivers communicating via impulse-radio ultra-wideband (IR-UWB) radio transmission or other pulse based signals.

More specifically, the invention concerns a method for estimating and correcting a frequency offset between the clocks of transceivers that communicate via electromagnetic signals that lack a continuous sinusoidal carrier, thereby implying that methods for correcting frequency offsets that require the presence of a continuous sinusoidal signal cannot be used. In particular, this method applies when two electronic devices communicate without having a common reference clock, but each device has its own free running clock. This method is of particular interest in low-cost, low complexity non-coherent devices based on energy-detection where high precision oscillators cannot be used to generate the clock.

BACKGROUND ART

The IEEE 802.15.4 [1] standard targets low data rate wireless networks with extensive battery life and very low complexity. Its physical layer is based on a narrowband radio, operating in the unlicensed ISM band around 2.4 GHz. IEEE 802.15.4a [2] is an amendment to the 802.15.4 specification. It adds an impulse-radio ultra-wide band (IR-UWB) physical layer operating in several bands of 500 MHz (and 1.5 GHz) from approximately 3 GHz to 10 GHz. This physical layer should offer a better robustness against interference and multipath propagation channels, a higher data rate, and the possibility to perform ranging between devices.

As it is the case in several modern (wireless) communication networks, information exchange in IEEE 802.15.4 is packet based. The bits to be sent are grouped into packets that are sent individually from the transmitter to the receiver over the wireless medium. In order to retrieve the bits from a packet, a receiver has to perform a certain number of tasks. First, the receiver has to actually detect the presence of the packet and subsequently determine where this packet begins. This process is commonly referred to as "packet detection and timing acquisition" or "synchronization". It generally relies on the presence of a so called "preamble" appended before the payload (the data bits). This preamble is known in advance to the receiver. Once synchronization is achieved, the receiver knows where to look for the unknown payload and can perform "demodulation and decoding" to recover it. Often, the receiver also performs a "channel estimation" step between synchronization and decoding to gain some knowledge about the statistics of the communication channel. This knowledge is then used to enhance the performance of demodulation and decoding.

Networks such as IEEE 802.15.4 networks are asynchronous networks. There is no common reference clock in the system. Rather, every device has its own free running clock. Furthermore, because the design objective of IEEE 802.15.4 devices is low-cost, low-power and low complexity, high precision oscillators cannot be used to generate the clock on these devices. Cheap oscillators available today have a precision of about ±20 ppm (parts per million). This implies that the clocks of two devices do not run at the exact same speed and their frequencies may thus differ slightly; after some time these clocks drift apart from each other. Consequently, in an asynchronous network with free running clocks, packet detection and timing acquisition has to be obtained for every packet individually. In addition, even within a packet, a mechanism ("clock offset tracking") is needed to maintain synchronization and compensate for clock drifts between a transmitter and a receiver. In IEEE 802.15.4a, synchronization and clock offset tracking are especially challenging because the fine temporal resolution of UWB signals requires high timing accuracies. Further, IR-UWB signals lack a continuous sinusoidal carrier. Therefore, classical solutions to address clock-offset issues in narrowband systems, such as phase-locked loops (PLL), cannot be used, since these methods require the presence of a continuous sinusoidal signal.

Finally, with more and more dense wireless networks emerging and being deployed, multi-user interference (MUI) between devices of the same network or neighboring networks starts to severely limit the network performance. It is therefore highly desirable that a receiver performs all the tasks needed to receive a packet in such a way as to limit the impact of MUI as much as possible.

Patent applications [10], [11] are, addressing ranging applications. In particular, they concentrate on the estimation of the time of arrival (TOA). The techniques proposed in [10], [11] construct an energy matrix for the problem of TOA estimation in ranging applications. These two patents contain:

the construction of an energy matrix from the output of a non coherent receiver;
the application of image analysis or pattern recognition techniques to the energy matrix;
the application of a leading edge detection algorithm on the matrix to find the TOA or the first multi-path channel tap;
the detection and removal of interference based on the energy matrix, plus the likelihood histogram concepts;
hypothesis testing to determine whether a certain column in the matrix corresponds to noise or useful signal;

These two patents do not contain the following elements:

any notion of angle in the energy matrix that can be used to detect clock frequency offsets. It even explicitly states that "It is important to note that received energies always form a straight column or row . . . ";
a single word on channel estimation;
a single word on combining different multi-path components for synchronization or TOA estimation. They are always only concerned with leading edge detection;
anything about thresholding the matrix to reject interference;
anything about transforming/compressing the energy matrix to reduce the memory requirement;
anything about the Radon or the Hough transform.

The concept of energy matrix, appears in [7], [6] where the output of an energy detector is represented in matrix form. The matrix is processed with filters known from image processing in order to reject narrowband and wideband interference. In both papers, the thresholds are only used to detect the arrival of the first path but not to reject interference terms. The filters described, especially the differential filter in [7], are well-known filters from image processing and may also be applied to the energy matrix of the present invention prior to transformation in order to enhance edge features.

The Hough transform as well as the more general Radon transform are well-established techniques from computer vision and image processing. The Hough transform, for example, goes back to a patent from 1962 [12] and the ρ, θ parameterization used widely today goes back to a paper published in 1972 [8]. Since then, there has been a large body of literature as well as patents related to the Radon/Hough transform. Most of these publications relate to applications requiring classical pattern recognition task in images (for example in computer tomography or radar applications) or they deal with ways to compute the transforms and their inverses in efficient ways. No document was found that proposes to use the Radon/Hough transform in any form in a radio communication receiver in general and for clock drift estimation or synchronization in particular.

Patent application [13] and the corresponding paper [14], describe a maximum likelihood estimator for clock drift estimation in a coherent or non-coherent IR-UWB low data-rate (LDR) receiver. Only clock drift estimation assuming perfect synchronization and channel estimation is treated. Several samples from the receiver are accumulated and yield nodes of a trellis on which the best path is calculated to yield the maximum likelihood estimate. Tracking and compensating for the drift is not treated, neither is it explained how to achieve synchronization and channel estimation.

Patent application [4] and its companion paper [15] contain a synchronization method that is robust to MUI. The method is for the synchronization of coherent receivers and has no notion of energy matrix whatsoever. However, its basic principle for rejecting interference, which is the proposed power independent detection method, can be applied to the received signal prior to placing it in the energy matrix and transforming it via the Radon/Hough transform in order to reject interference.

Patent application [3] and the corresponding conference paper [16] contain methods to reject interference in a non-coherent IR-UWB receiver. The methods described therein can be used for interference mitigation also during the clock offset tracking method once the channel estimation has been performed.

DISCLOSURE OF INVENTION

The object of the present invention is achieved by a method for estimating and correcting a frequency offset between a local clock of a receiving transceiver and a remote clock of a corresponding emitting transceiver, said receiving transceiver receiving from the emitting transceiver electromagnetic signals that lack a continuous sinusoidal carrier, said method comprising the steps of:
  receiving by said receiving transceiver, a signal emitted by the emitting transceiver, said signal lacking a continuous sinusoidal carrier and being formed of at least one symbol, each symbol being emitted within a time frame having a first duration $T_f^{pre}$;
  sampling the said received signal by taking for each frame a set of energy measurements of said received signal;
  forming a matrix representative of said energy measurements;
  determining from said energy matrix, points of maximum of energy within each of said time frames;
  determining a straight line connecting a plurality of points of maximum of energy within each of said time frames;
  determining a slope of said straight line;
  calculating a frequency offset between the clock of the emitting transceiver and the clock of the receiving transceiver by using the slope of said straight line;
  adjusting the frequency of the receiving transceiver's clock according to the calculated frequency offset.

The object of the present invention is also achieved by a method for estimating and correcting a frequency offset between a local clock of a receiving transceiver and a remote clock of a corresponding emitting transceiver, said receiving transceiver receiving electromagnetic signals from the emitting transceiver said signal lacking a continuous sinusoidal carrier, said method comprising the steps of:
  receiving by said receiving transceiver, a signal emitted by the emitting transceiver, said signal lacking a continuous sinusoidal carrier and being formed of at least one symbol, each symbol being emitted within a time frame having a first duration $T_f^{pre}$;
  sampling the said received signal by taking for each frame a set of energy measurements of said received signal;
  defining an initial Radon matrix;
  for each energy measurement, calculating a contribution of this energy measurement to an entry of the Radon matrix;
  updating the Radon matrix by adding said contribution;
  determining at least one point of maximal energy value in the Radon space;
  determining a column of the Radon matrix containing at least one of said at least one point of maximal energy value;
  calculating a frequency offset between the clock of the emitting transceiver and the clock of the receiving transceiver by using the determined column of the Radon matrix;
  adjusting the frequency of the receiving transceiver's clock according to the calculated frequency offset.

The object of the present invention is further achieved by a receiver that implements the method of the invention.

The main pillars of this invention are the following:
  the output of the receiver can be arranged as an energy matrix. We observed that frequency offsets leave a characteristic pattern in the matrix resembling parallel lines at a certain angle and that there is a one-to-one relation between this angle and the clock frequency offset to be estimated. Several methods of choice can be applied to estimate this angle (and consequently the clock frequency offset).
  The energy matrix can be transformed in an online fashion using the Radon/Hough transform yielding a smaller (compressed) matrix that is easy to update and maintain during the reception of a packet. The frequency offset can, for instance, be estimated from this compressed matrix.
  Not only clock frequency offset estimation but also synchronization and channel estimation can be performed directly on this compressed matrix, yielding one compact method for performing three main receiver tasks.
  the method of the present invention can be enhanced to incorporate robustness to MUI by using methods from our previous patents [3], [4].

BRIEF DESCRIPTION OF DRAWINGS

The present invention and its advantages will be better understood with reference to the detailed description of an embodiment and to the enclosed drawings, wherein.

MODES FOR CARRYING OUT THE INVENTION

In what follows, the invention is described in the context of a non-coherent receiving transceiver or receiver based on energy detection. Further, we use the signaling model of the IEEE 802.15.4a preamble part as an example. This is only done for simplicity and to serve as an example. Most of the concepts can be extended in a straightforward way to other receiver architectures (e.g. coherent), other signaling formats (e.g. the data part of an IEEE 802.15.4a packet or any other IR-UWB or pulse-based signaling format). Where an extension is not straightforward, we will comment on how it can be done.

Figure 1:
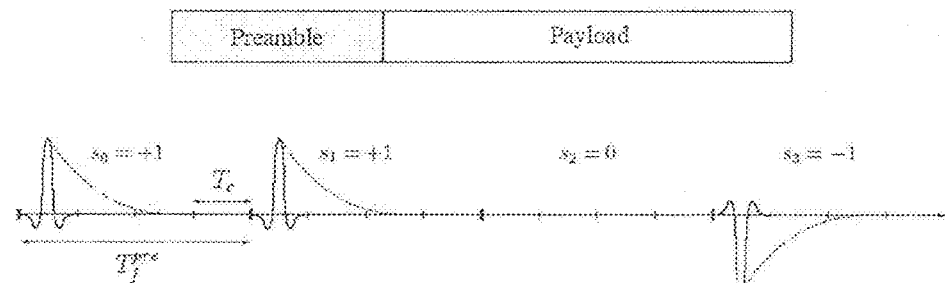
FIG. 1 shows on the upper part, the general structure of a packet that can be used with the method and the receiver of the present invention, and on the lower part, a possible timing structure of the first part of said packet.

1) System Model and Assumptions: Assume a packet structure as it is used e.g. in IEEE 802.15.4a. According to this standard, FIG. 1 shows on the upper part, a packet structure comprising a preamble and a payload. The lower part of FIG. 1 illustrates the preamble. As an example, in FIG. 1, the preamble part of the packet is formed of a ternary preamble code sequence s=(+1, +1, 0, −1). Possible multipath components are represented with a dashed line. The main time-unit of a packet is a chip of duration $T_c$. A certain number of subsequent chips grouped together form a time frame $T_f^{pre}$. Every packet consists of two parts: a preamble known at the receiver, followed by a payload that carries the unknown data bits. The preamble is mainly used for synchronization but once the receiver is synchronized to the sender, its known structure can also be exploited for channel estimation. The preamble consists of $N^{pre}$ frames of duration $T_f^{pre}$. At most one (possibly modulated) transmitted symbol consisting of at least one pulse is sent per frame.

The received signal during the preamble then has the following format $$x^{pre}(t) = \sum_{i=0}^{N^{pre}-1} s_i \cdot h(t - iT_f^{pre}) + n(t) \quad (1)$$

where h(t) is the unknown received waveform, n(t) accounts for thermal noise and MUI and $s_i$ is given by a known preamble code (e.g. $s_i \in \{-1, 0, +1\}$ in the case of the IEEE 802.15.4 a ternary sequence). In the following, we assume for simplicity, regularly spaced transmit symbols consisting of one single pulse each and no time-hopping during the preamble.

Figure 2:
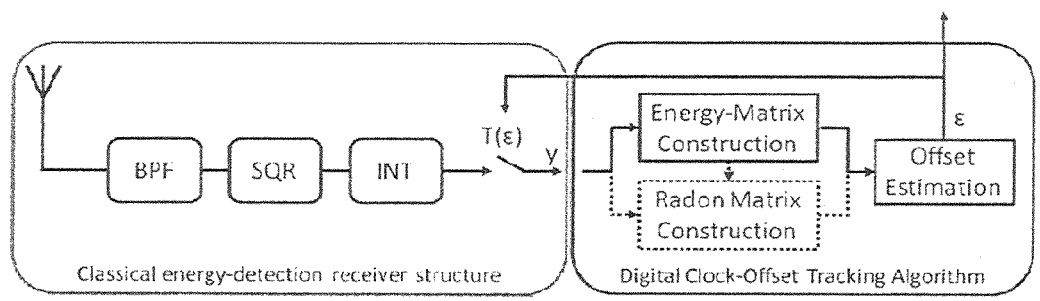
FIG. 2 illustrates a classical Energy Detection Receiver Structure.

2) Classical Energy Detection Receivers: The basic structure of a classical energy detection receiver [5] is shown in FIG. 2. More specifically, FIG. 2 illustrates a receiver that implements the method of the invention. The receiver corresponds to a classical Energy Detection. Receiver Structure, followed by the described Clock-Offset Tracking Algorithm, which can be implemented using a memory and a processor such as a digital signal processor or a microprocessor, an application-specific integrated circuit (ASIC), discrete logic components, or any other manner known in the art. Those of skill in the art will recognize that the energy detection receiver structure shown in FIG. 2 is but one example of an energy detection receiver structure with which the Clock-Offset Tracking Algorithm may be used. The clock-frequency offset £ can be estimated either a) directly from the Energy-Matrix that is constructed from the input samples, b) by transforming the Energy-Matrix into a Radon Matrix and estimating the offset from the Radon Matrix, or c) by direct computation of the Radon Matrix, in which case calculation of the Energy-Matrix is omitted. The estimated clock-offset can be passed to higher layers of the receiver (not shown in FIG. 2), e.g., to improve a ranging estimate, or it can be used to adjust the clock of the receiver.

During both the preamble and the payload, a classical energy detection receiver receives a signal x(t) and performs initial bandpass filtering in a filter referred to as BPF. The filtered signal is then squared in a device SQR and integrated in a device referred to as INT. The output of the integrator is sampled at a certain rate 1/T (where T is called the integration time), yielding the following sequence of observations:

$$y_m = \int_{mT}^{(m+1)T} x^2(t) dt \quad (2)$$

Hence, every sample $y_m$ corresponds to the received signal energy in a window of duration T. In what follows, we will, without loss of generality, assume T=$T_c$.

Figure 3:
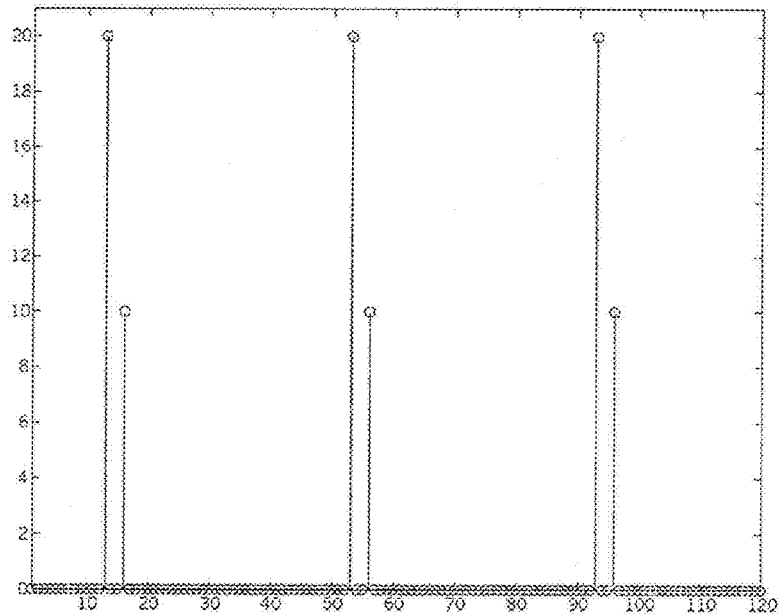
FIG. 3 shows the output of a receiver of FIG. 2 if no clock drift is present; here the period M of the signal is M=40; noise is neglected for illustrative purpose.
Figure 4:
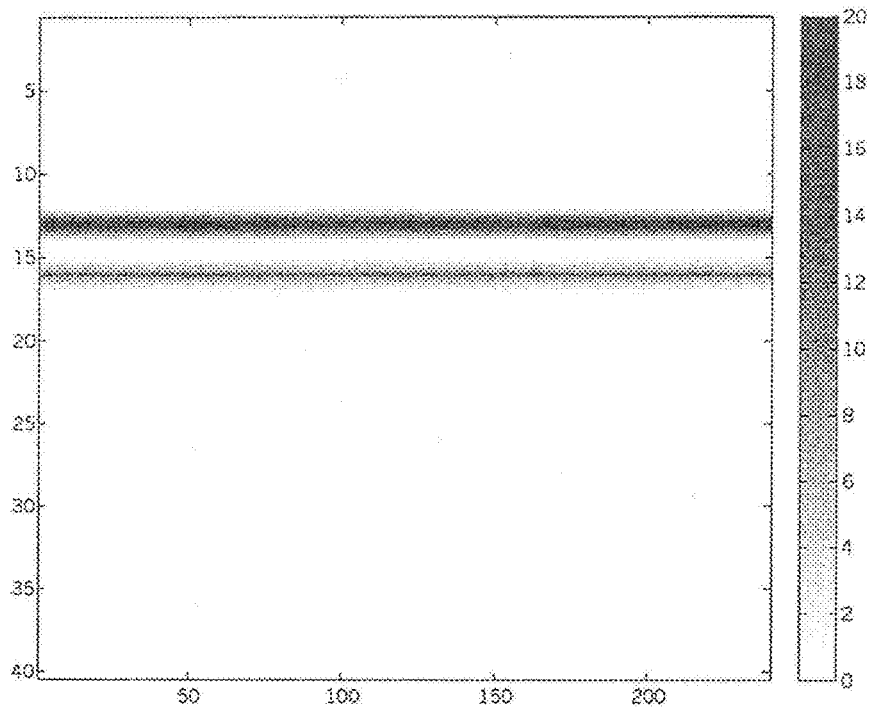
FIG. 4 shows an energy matrix corresponding to the receiver output of FIG. 3.

3) Energy Matrix from Receiver Output: The output of the receiver, $y_m$, can be stored in an energy matrix (as it is done e.g. in [6]). For each frame, we have M=$T_f^{pre}$/T samples. We store samples column-wise where every column contains M consecutive samples. Accordingly, two subsequent entries of a column of the energy matrix contain two subsequent values of the energy obtained by sampling the signal received by the receiver. The signal in (1) has a certain periodicity with period $T_f^{pre}$ and consequently, the discrete signal $y_m$ also exhibits the same periodic behavior with period M. Thus, two subsequent entries of a row of the energy matrix contain two values of the energy obtained by sampling the signal received by the receiver, delayed by a multiple of said first duration $T_f^{pre}$. Arranged in an energy matrix, this leads to a pattern resembling parallel lines. These parallel lines correspond to the multipath components of the signal. FIG. 3 shows an example of a signal with 40 samples per frame (M=40). As shown in FIG. 3, there is at least one point of maximum energy within each time frame $T_f^{pre}$. In the example of FIG. 3, there are two maxima within each frame, i.e. an absolute maximum and a local maximum. As can also be seen from FIG. 3, it is possible to determine a straight line connecting a plurality of points of maximum energy. One line can connect the absolute maxima points and another straight line can connect the local maxima straight lines. These two lines are parallel. FIG. 4 shows the corresponding energy matrix. One can clearly observe the two parallel lines corresponding to the two highest signal contributions. Existing solutions [6], [7] would now try to achieve synchronization by looking for the leading edge of the signal. In the context of the energy matrix, this amounts to finding the uppermost parallel line.

4) The Effect of drifting clocks on the Energy Matrix: We will assume now that the clock frequencies at the transmitter and the receiver are related as $f_t/f_r=1+\epsilon$ where $\epsilon$ accounts for the relative offset between the two clocks. A time duration $T_d$ measured by the transmitter will now correspond to a measured duration of $(1+\epsilon)T_d$ at the receiver. We can account for this in our signal model by adapting equation (2) (with the integration time $T=T_c$) to:

$$y_m = \int_{mT_c(1+\epsilon)}^{(m+1)T_c(1+\epsilon)} x^2(t)dt \quad (3)$$

Figure 6:
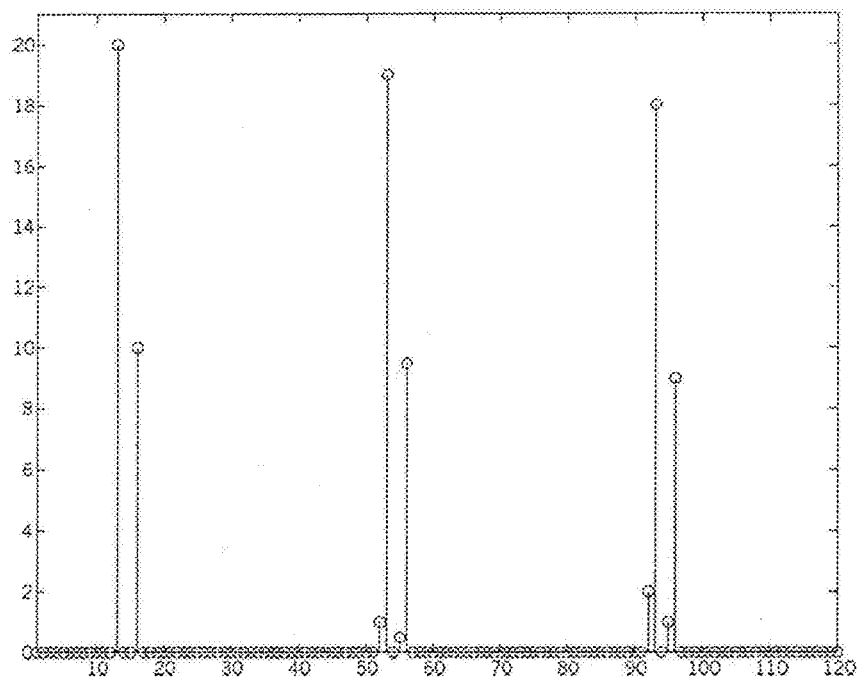
FIG. 6 shows the output of a receiver of FIG. 2 with a hypothetical clock drift of $\epsilon$=1e-3; noise is again neglected for illustrative purpose.
Figure 7:
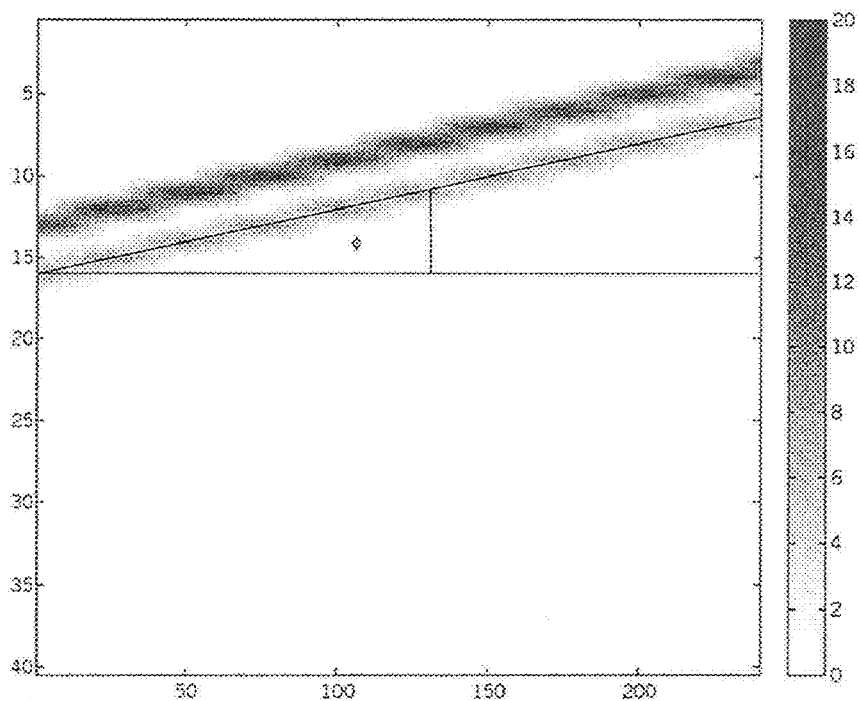
FIG. 7 shows an energy matrix corresponding to the receiver output of FIG. 6; lines are no longer parallel but inclined at an angle $\phi$ that directly relates to the clock drift: $\phi$=arctan(M×$\epsilon$)

The consequence on the received samples $y_m$ is the following. Assume that for the sample $y_0$ the integration window is aligned with the received signal such that it captures the entire energy of a symbol. If the clock of the receiver runs faster (or slower) than the clock of the transmitter, for the sample $y_M$, the alignment, of the integration window is no longer perfect and some of the energy "leaks" into the sample $y_{M-1}$ ($y_{M+1}$, respectively). In the energy matrix this effect will become visible because we no longer have rows forming straight lines but we have a pattern resembling parallel lines at a certain angle. There is a one-to-one relationship between this angle $\phi$ and the clock frequency offset $\epsilon$: $\phi = \arctan(M \times \epsilon)$: Estimating the angle is thus equivalent to estimating the clock frequency offset. This key observation is the basis of this invention. An example of the receiver output and of the corresponding energy matrix with clock drift is shown in FIG. 6 and FIG. 7

5) Several Methods to Estimate the Clock Frequency Offset from the Energy Matrix: The angle described above and thus the clock drift can be estimated by using several methods:
   Classical maximum likelihood (ML) estimation techniques
   Least-squares (LS) techniques when the complexity needs to be lower than for ML techniques.
   General fitting techniques.
   Techniques stemming from image processing and more specifically, line or edge detection.

If we are only concerned with the estimation of the clock drift and complexity is not the main issue, any of the above methods may apply. However, for low-complexity transceivers such as those envisioned for the IEEE 802.15.4s amendment there are some special considerations to be made.

a) For being able to observe and estimate clock drifts, a large amount of samples needs to be collected. For a lot of the techniques mentioned above (LS, ML) this amounts more or less to storing the energy matrix corresponding to a huge portion of a received packet, leading to a significant memory requirement.

b) Tracking is also required: in most cases, we are not only concerned with estimating the clock drift, but we also want to constantly compensate for it in order to stay aligned with the packet (tracking). One does so by adjusting the frequency of the receiver's oscillator. Ideally one would like to start compensating for drift as soon as it becomes observable even though the current estimate of the clock drift might not be perfect. Ideally, the estimate will get better and better over time as one has more observations.

c) New observations after adjusting the receiver clock will be obtained with the new adjusted sampling frequency leading to a change of the pattern in the energy matrix.

d) Ideally, we would like to have a method that allows for the estimation of the clock drift in an online fashion, based on the parts of the packet that are currently available. We would then like to be able to adjust the receiver clock based on the current estimate. As new observations become available, the estimate should be refined to take into account the history as well as the new observations. Additionally, the method should have a constant memory requirement that does not require storing the entire signal history.

The present invention uses such method based on the Radon/Hough transform that fulfills exactly these requirements.

6) Radon/Hough Transform: The (two-dimensional) Radon and Hough transforms are techniques widely used in image processing for detecting straight lines. The Hough transform is special case of the Radon transform where the input image is binary. In the following, we will use the more general term Radon transform. The Radon transform can be expressed in different ways and several parameterizations exist. We use the common $\rho$, $\theta$ parameterization [8].

An image can be transformed to the Radon space through the Radon transform. The equation of the line $$y = ax + b \quad (4)$$

can be rewritten as $$y = -\frac{\cos\theta}{\sin\theta}x + \frac{\rho}{\sin\theta} \quad (5)$$

where the parameter $\rho$ represents the distance between the line and the origin, while $\theta$ is the angle of the vector from the origin to the closest point on the line. We can rewrite (5) as $$\rho = x\cos\theta + y\sin\theta \quad (6)$$

Any line in the image can thus be mapped to one unique point $(\rho, \theta)$ in the Radon space. The Radon transform assigns to any $(\rho, \theta)$ in the Radon space the value of the integral obtained by integrating along the line given by (5) in the original image.

Therefore, finding lines in the original image amounts to finding points in the Radon space. The basic idea of the invention is to apply this principle to the problem of clock drift estimation.

7) Radon Transform of the Receiver Output: Rather than storing and working on the energy matrix directly, we calculate the Radon transform on the receiver output $y_m$ and work in Radon space. Now, contrary to the case of an analog image, the output of the receiver is not a continuous signal, but a discrete one. In the energy matrix, we do not have continuous lines, but discrete lines. Along the same line, we cannot store a continuous Radon matrix either, but we need to discretize $\rho$ and $\theta$. Nevertheless, the patterns left by the clock drift should correspond to a local maxima in the Radon space. Let $\hat{\Phi}$ denote the angle that We are trying to estimate. The angle $\theta$ corresponding to the maxima corresponds exactly to $\hat{\Phi}$.

It can also be seen from (6) that the Radon transform lends itself to online updating as we can calculate the contribution of one sample $y_m$ (to every sample $y_m$, we can associate coordinates $x_k$, $y_k$ as $y_k$=m mod M, $$x_k = \left\lfloor \frac{m}{M} \right\rfloor)$$

to each point $(\rho, \theta)$ in isolation of all the other (past or future) samples.

In order to update the Radon matrix, an initial Radon matrix is first defined. The energy of the received signal is sampled and the contribution of each sample is calculated. Each contribution is then added to the current Radon matrix, the first contribution being added to the initial Radon matrix. This initial Radon matrix could for example be a null matrix.

This means that we never have to construct and/or store an energy matrix at all We can directly compute the Radon matrix from the receiver output.

In the following sections we will however often still make the "detour" over the energy matrix as it makes explanations and illustrations easier. But in principle and especially in a receiver implementation one would calculate the Radon matrix directly.

Figure 9:
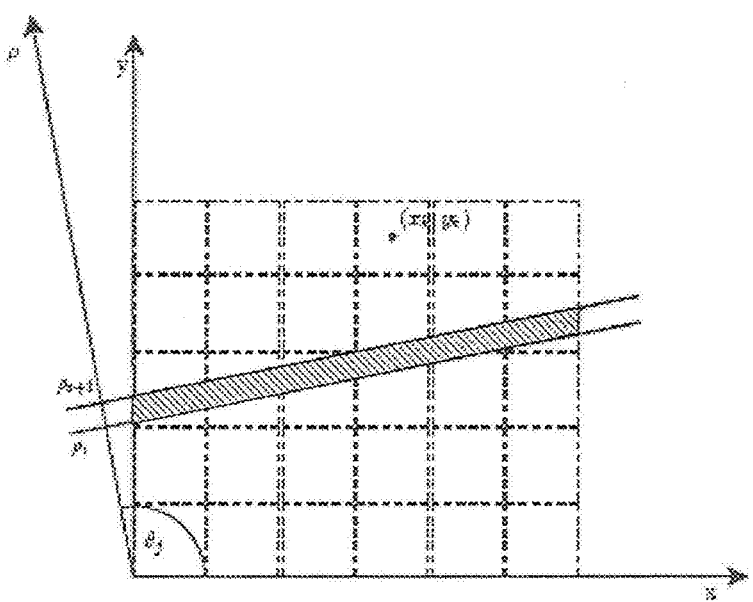
FIG. 9 is a schema showing how to calculate a Radon Transform; the total intensity of the oblique hatched area will be attributed to the entry ($\rho_i$, $\theta_j$) of the Radon transform matrix.

FIG. 9 shows a schema of how we obtain the Radon matrix. We first create a "continuous image" from the discrete energy matrix. As explained above, every sample of the receiver output corresponds to a coordinate $(x_k, y_k)$. We assume that this coordinate is the center coordinate of a pixel with a width of 1. The energy value $y_m$ of the corresponding sample is denoted by $I(x_k, y_k)$ and we call it the intensity of the pixel $(x_k, y_k)$. We here assume that the intensity is uniformly spread over the whole pixel. But other alternatives using different densities are also thinkable. Such densities could be a punctual or Gaussian density for example. The entry of $R_{ij}=R(\rho_i, \theta_j)$ of the discretized Radon matrix is then obtained by calculating the total intensity found between the parallel lines (inclined by $\theta_j$=j*$\Delta\theta$) passing through $\rho_i$ and $\rho_{i+1}$. The spacing $\Delta\rho=\rho_{i+1}-\rho_i$ is a parameter given by the discretization scheme used and can be changed. The same holds for the spacing $\Delta\theta$.

Figure 5:
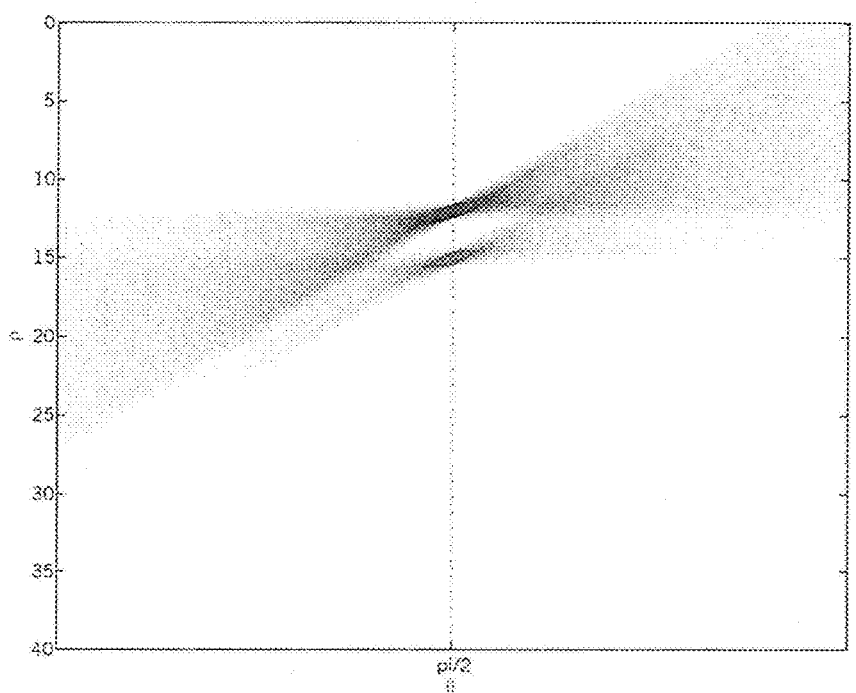
FIG. 5 shows the Radon matrix of the receiver output of FIG. 3.
Figure 8:
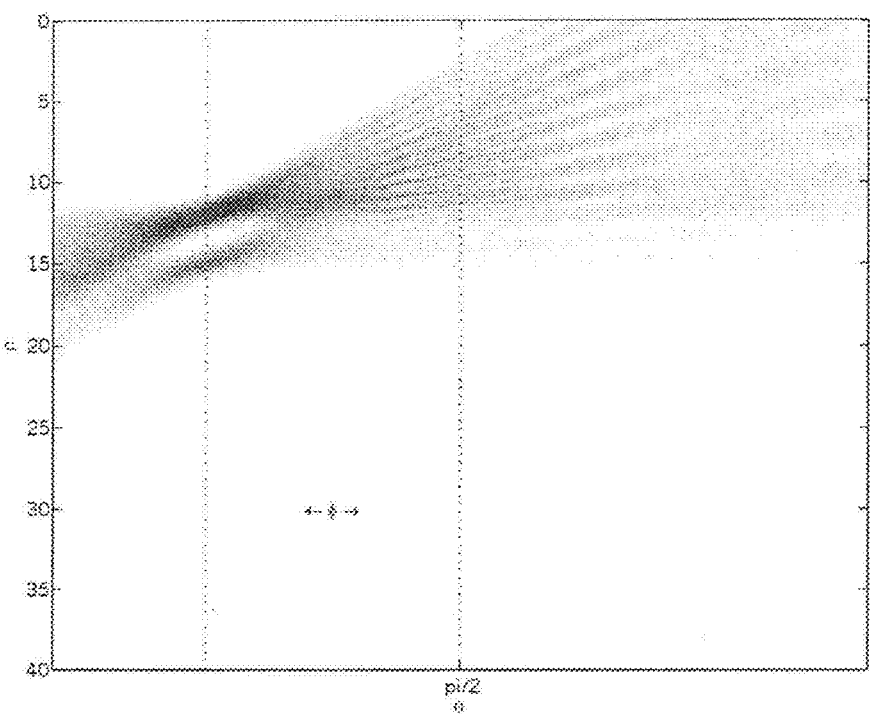
FIG. 8 shows the Radon matrix of the receiver output of FIG. 6. The maximum is off the right angle by an amount corresponding to the angle $\phi$ that directly relates to the clock drift.

FIG. 5 and FIG. 8 show the Radon matrix corresponding to the receiver output shown in FIG. 3 and FIG. 6 respectively.

Because the precision of the oscillators is known, the range of $\theta$ as well the range of $\rho$ that is of interest to us is known. Therefore, we can calculate the Radon transform for only the points of interest, limiting both processing and memory requirements. Thus, the Radon matrix that we have to store has a constant size independent of the length of our observation. We can see the Radon transform as a compression scheme that instead of the energy matrix yields an alternative matrix of smaller dimension that still preserves all the signal information that is necessary to do clock drift estimation.

Moreover, if we correct for a given clock drift by adjusting the frequency of the underlying oscillator, we can adapt the Radon transform of new samples such that their transform can be stored in the same Radon matrix than for the previous samples (before the correction were stored in). This allows for building up a consistent Radon transform of the receiver output even though we are constantly changing the sampling frequency to correct the drift. It also allows us to keep the whole history of the signal at no additional memory cost leading to a constantly better clock offset compensation.

Figure 10:
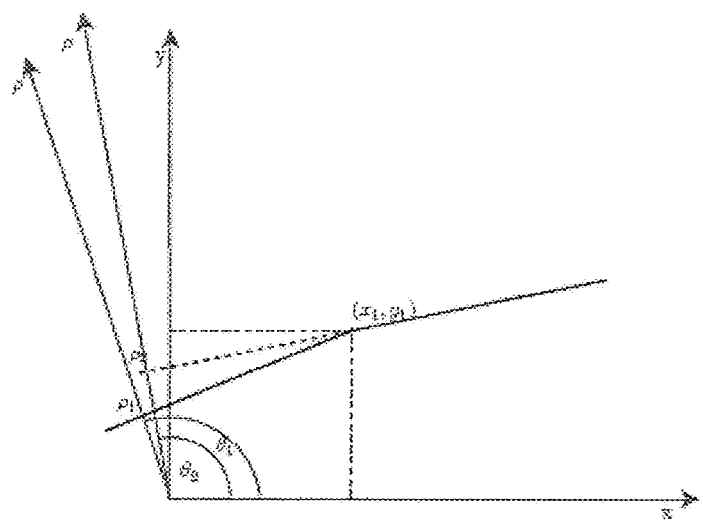
FIG. 10 is a schema showing how to adapt to changing clock drift.
Figure 11A:
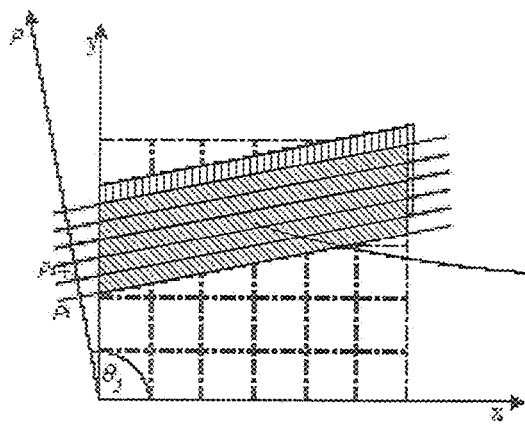
FIG. 11a illustrates an example wherein we convolve each column of the Radon matrix with an all-ones vector of length W=5 to get a transformed Radon matrix.
Figure 11B:
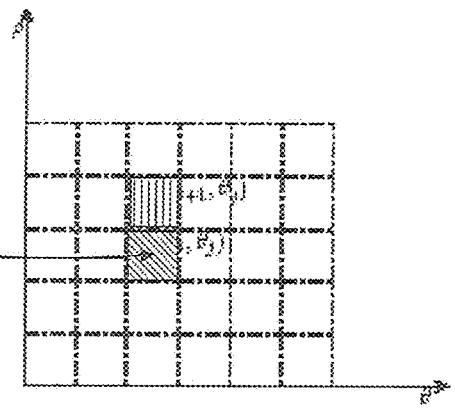
FIG. 11b represents the intensity corresponding to ($\rho_i$, $\theta_j$) of the transformed matrix.

FIG. 10 illustrates how to adapt the Radon transform after a correction of the drift. What we basically do is to transform the coordinate system in Radon space after a drift correction has occurred. The example shows the simplified case of a single line, but extension to the situation in FIG. 9 with a small band is straightforward. In FIG. 10, we have a line at an angle $\theta_1$ that gets projected to $\rho_i$ according to equation (6). At column (or "time") $x_1$, we adjust the clock of the receiver resulting in a change of the angle by $\Delta_1$ and consequently in a line at an angle $$\theta_2 = \theta_1 + \Delta_1 \quad (7)$$

For the point $(x_1, y_1)$ we get the following set of equations according to (6):

$$\rho_1 = x_1 \cos\theta_1 + y_1 \sin\theta_1 \quad (8)$$

$$\rho_2 = x_1 \cos\theta_2 + y_1 \sin\theta_2 \quad (9)$$

From (7)-(9) we get after some basic algebra $$\rho_2 = \frac{\rho_1 \sin(\theta_1 + \Delta_1) - x\sin\Delta_1}{\sin\theta_1} \quad (10)$$

If we generalize this to the case where we adjust for clock drift several times (at $x_1, x_2, \ldots$ by $\Delta_1, \Delta_2 \ldots$) we find $$\theta_m = \theta_1 + \sum_{i=1}^{m-1} \Delta_i \quad (11)$$

and $$\rho_m = \frac{\rho_1 \sin(\theta_m) - \sum_{i=1}^{m-1} x_i \sin\Delta_i}{\sin\theta_1} \quad (12)$$

knowing that $\theta_m \approx \pi/2$ we can even simplify (12) to $$\rho_m \approx \rho_1 - \sum_{i=1}^{m-1} x_i \sin\Delta_i \quad (13)$$

Equations 11 and 12 define the transformation we have to apply on the coordinate system. To be able to do this transformation, we just have to keep the two values $\Sigma_{i=1}^{m-1}\Delta_i$ and $\Sigma_{i=1}^{m-1}x_i \sin\Delta_i$ up to date.

8) Estimating the Clock Drift from the Radon Transform Matrix: Once we obtained the Radon matrix of the receiver output according to the techniques described in the previous section, we want to estimate the clock drift or equivalently, the most likely angle $\hat{\Phi}$. If we look for maxima in the Radon matrix, we should find them around $\hat{\Phi}$. Due to multipath, there will be more than one such maximum at different values of $\rho$. Ideally, we would like to take advantage of this by combining the contributions of different multipath components. There are certainly several ways to accomplish this. We will describe our method of choice here. One particularity of the Radon transform matrix is that its column sums are all equal. Therefore the naive approach of choosing $\hat{\Phi}$ which has the highest intensity averaged over all $\rho$ does not work. Our method is to first convolve every column of the Radon matrix with an all-one vector of length W. Typically, we choose W such that this results in combining ρ values corresponding to 1-2 pixels. So if $\Delta\rho=\frac{1}{8}$, W would be somewhere around $8*2=16$. FIG. 8 shows to what part of the energy matrix an intensity value of the resulting matrix would correspond. We then square each entry of the resulting matrix. We finally choose $\hat{\Phi}$ corresponding to the column of this transformed matrix having the largest column sum $$\hat{\varphi} = \Delta\theta \cdot \underset{j}{\text{argmax}} \sum_k ((rect_W * R_{.,j})[k])^2$$

where $rect_w$ is a rectangular window of length W, $R_{.,j}$ denotes the $j^{th}$ column of the Radon matrix R and * denotes convolution.

9) Synchronization and Channel Estimation can also be done in Radon Space: Once we have determined the most likely clock drift $\hat{\Phi}$, we can look at the corresponding column with index $j_{max}$ in the Radon matrix. (In FIG. 8, this corresponds to the column indicated by the dashed line at $$\frac{\pi}{2} - \varphi).$$

We can see mat every multipath component of the received signal leaves a distinct feature in form of a point with high intensity (local maximum) in said column. Further, every multipath component will produce a local maximum whose value is proportional to the energy of the multipath component. The vector formed by column $j_{max}$ of the Radon matrix thus gives us an estimate of the channel energy-delay profile. Channel estimation can thus be performed in Radon space as well.

Synchronization and time of arrival (TOA) estimation deal with finding the first arriving multipath component of a signal. We can also achieve this in Radon space, again by looking at the column $j_{max}$ corresponding to the most likely clock drift. Coarse synchronization or estimation of the TOA of the strongest multipath component is achieved by determining the ρ value $\rho_{max}$ of the entry with maximal intensity in column $j_{max}$ of the Radon matrix. Given ρ, it is straightforward to calculate the corresponding time index through equation (5). For a finer synchronization or to find the TOA of the first multipath component, we can employ any commonly used fine synchronization method that searches the first arriving path starting from the position of the strongest path. This can be done by a classical search-back procedure where entries in the column $j_{max}$ are searched in a window around $\rho_{max}$ and the one with the lowest ρ index that has significant energy is kept as an estimate of the TOA of the first multipath component.

It is thus possible to solve three key problems: namely clock drift estimation, synchronization and channel estimation by solely looking at the compact signal representation given by the Radon matrix. Further, the Radon transform can be computed in an online fashion so there is no need to construct or store an energy matrix in this case.

10) Enhance Robustness to Noise: The Radon transform is already quite robust to noise. However, we further increase this robustness with a pre-processing on the energy matrix before the calculation of the Radon transform. First, if synchronization was acquired and a known preamble code is used as it is the case in IEEE 802.15.4a, we take into account the preamble code by only considering samples $y_n$ where the corresponding code symbol $s_n$ is not equal to 0.

Further, one can optionally combine several samples through a moving average process to get processing gain. A moving average filter is then applied over the last G symbols along the rows of the energy matrix (where G is a design parameter; if no averaging takes place, G=1). Finally, the elements of the resulting smoothed energy matrix that are below a threshold $v_1$ are set to zero. Because the noise follows a chi-square distribution, we calculate the threshold $v_1$ to reject samples with a probability of more than q % (where q is again a design parameter assumed here to be 5%) to consist of noise only:

$$v = \frac{N_0}{2} F^{-1}_{\chi^2_{2BT\cdot G}}(1 - 0.05)$$

where $N_0/2$ is the (estimated) noise power spectral density and $F_{\chi^2_{2BT\cdot G}}$ is the cumulative distribution function of the chi-square distribution with $2BT \cdot G$ degrees of freedom.

11) Robustness of the Radon Transform to MUI: The Radon transform can be made robust to MUI by preprocessing samples prior to transformation through methods similar to those proposed in our previous patents [3], [4].

Once channel estimation is achieved, the thresholding operation from [3] can be applied to reject interference. This is done similarly to the method explained in §10) to reject noise, only that this time samples above a threshold $v_2$ are rejected because they are likely to contain interference. $v_2$ is calculated similarly to v1 only that the central chi-square distribution with 2BTG degrees of freedom is replaced by a non-central chi-square distribution with 2BTG degrees of freedom and non centrality parameter $\lambda_m$ with $\lambda_m$ equal to the estimated channel energy of the $m^{th}$ sample. Also, as detailed in [3] the averaging operation that combines G symbols may optionally be done using ordered statistics (e.g. the median) to improve robustness against outliers caused by interference. Prior to channel estimation, samples can be combined in a PID fashion (power independent detection method, see [4]). In this case, the preprocessing operation detailed in §10) is applied, setting samples below $v_1$ to 0. Samples above $v_1$ are however all set to 1 such that they all contribute equally to the averaging process. The averaging operation is then performed over G binary samples and yields the input to the Radon transform.

In addition, any other of the non linear filtering techniques proposed on the energy matrix by [7] and [6] can also be considered.

II. INDUSTRIAL SECTORS, APPLICATIONS, AND ECONOMIC POTENTIAL

Our invention directly applies to IEEE 802.15.4a receivers and by extension to the IEEE 802.15.4 standard also known as ZigBee.

IEEE 802.15.4 is a standard for low-power, low-complexity wireless personal area networks. The field of possible applications includes environmental monitoring, home automation, medical applications, industrial and building automation. To become economically feasible, the prices of the devices forming the network should be as cheap as possible. Hence, there are constraints on the processing power and complexity of such devices. The fact that these devices need to be cheap to manufacture as well as the fact that they are battery operated, lead to low-complexity devices with limited communication and processing capabilities.

In addition, the large number of devices that will be operated at the same time leads to significant amounts of so-called in-system or multi-user interference (MUI). MUI can be created by devices in the same network that want to communicate at the same time, but also by devices belonging to different networks operating in the same area. Whatever the source of MUI, with more and more of these dense networks emerging, mechanisms to combat interference and reduce its impact are required.

Due to these constraints it is for example not possible to use high precision oscillators in such devices (see Section I-A). Cheap oscillators typically used have a precision of the order of ±20 ppm, which is enough to create significant clock drift during the reception of a packet. Mechanisms to adjust to this clock drift are thus needed for every device to operate correctly, indicating a huge economical potential. Further, IR-UWB systems such as IEEE 802.15.4a do not have continuous sinusoidal carrier signal and classical narrowband solutions for clock-offset tracking such as phase-locked loops can therefore not be used.

Additionally, the method of the invention cannot only be used for clock offset estimation and correction, but also for synchronization and channel estimation which are two other basic functions every device in the above mentioned wireless networks has to perform. Having one single method to solve most of the key problems in a low-complexity wireless receiver would obviously be of huge interest to any industrial player.

We believe that our solution is very interesting for such devices for the following reasons:
  It is suitable for low-complexity, non-coherent receiver architectures.
  It does not require the presence of a continuous sinusoidal carrier signal.
  It has only limited memory requirements.
  It can be made robust against MUI.
  It can also be used to perform synchronization and channel estimation which is again favorable in terms of complexity reduction. One single digital algorithm for almost all basic functions such a device needs to perform.

REFERENCES

[1] "Ieee Standard for information technology—telecommunications and information exchange between systems—local and metropolitan area networks—specific requirements part 15.4: Wireless medium access control (mac) and, physical layer (phy) specifications for low-rate wireless personal area networks (wpans)," *IEEE Std* 802.15.4-2006 *(Revision of IEEE Std* 802.15.4-2003), 2006.

[2] "IEEE P802.15.4a/D5 (amendment of IEEE std 802.15.4), part 15.4: Wireless medium access control (MAC) and physical layer (PHY) specifications for low-rate wireless personal area networks (LRWPANs)," September 2006.

[3] M. Flury, R. Merz, and J.-Y. Le Boudec, "Method for retrieving data from Ultra Wideband radio transmission signals and receiver implementing said method," 2009.

[4] A. El Fawal and J.-Y. Le Boudec, "Synchronizing method for impulse radio network," US Patent application 20060093077, May 4, 2006.

[5] C. Carbonelli and U. Mengali, "M-ppm noncoherent receivers for uwb applications," *IEEE Trans. Wireless Commun.*, vol. 5, no. 8, pp. 2285-2294, 2006.

[6] Z. Sahinoglu and I. Guvenc, "Multiuser interference mitigation in noncoherent uwb ranging via nonlinear filtering," *EURASIP Journal on Wireless Communications and Networking*, vol. 2006, pp. 1-10, 2006.

[7] D. Dardari, A. Giorgetti, and M. Z. Win, "Time-of-arrival estimation of uwb signals in the presence of narrowband and wideband interference," in *Ultra-Wideband, 2007. ICUWB 2007. IEEE International Conference on*, 2007, pp. 71-76.

[8] R. O. Duda and P. E. Hart, "Use of the hough transformation to detect lines and curves in pictures," *Commun. ACM*, vol. 15, no. 1, pp. 11-15, 1972.

[9] "Zigbee alliance, http://www.zigbee.org," January 2008.

[10] Z. Sahinoglu and F. M. Porikli, "Constructing an energy matrix of a radio signal," Patent application, WO/2006/112850, 2006, patent holder: Mitsubishi Electric Research Laboratories.

[11] Z. Sahinoglu, "Transmitting signals for time of arrival estimation," Patent application, PCT/US2005/013590, 2006, patent holder: Mitsubishi Electric Research Laboratories.

[12] P. Hough, "Method and means for recognizing complex patterns," U.S. Pat. No. 3,069,654, 1962.

[13] A. Wellig, "Method and device for estimating the relative drift between two clocks, in particular for ranging applications in uwb-ldr technology," patent application Ser. No. 11/850,934 2007, patent Holder: STMicroelectronics N.V.

[14] A. Wellig and Y. Qiu, "Trellis-based maximum-likelihood crystal drift estimator for ranging applications in uwb-ldr," in *Ultra-Wideband, The 2006 IEEE 2006 International Conference on*, 2006, pp. 539-544. [Online]. Available: http://dx.doi.org/10.1109/ICU.2006.281606

[15] A. El Fawal and J.-Y. Le Boudec, "A Robust Signal Detection Method for Ultra Wide Band (UWB) Networks with Uncontrolled Interference," *IEEE Transactions on Microwave Theory and Techniques (MTT)*, vol. 54, no. 4, part 2, pp. 1769-1781, 2006.

[16] M. Flury, R. Merz, and J.-Y. Le Boudec, "An Energy Detection Receiver Robust to Multi-User Interference for IEEE 802.15.4a Networks," in. *IEEE International Conference on Ultra-Wideband (ICUWB* 2008), 2008.

The invention claimed is:

1. A method for estimating and correcting a frequency offset between a local clock of a receiving transceiver and a remote clock of a corresponding emitting transceiver, said receiving transceiver receiving from the emitting transceiver electromagnetic signals that lack a continuous sinusoidal carrier, said method comprising the steps of:
  receiving by said receiving transceiver, a signal emitted by the emitting transceiver, said signal lacking the continuous sinusoidal carrier and being formed of at least one symbol, each symbol being emitted within a time frame having a first duration $T_f^{pre}$;
  sampling the said received signal by taking for each frame a set of energy measurements of said received signal;
  forming a matrix representative of said energy measurements;
  determining from said energy matrix, points of maximum energy within each of said time frames:
  determining a straight line connecting a plurality of said points of maximum energy;
  determining a slope of said straight line;
  calculating a frequency offset between the clock of the emitting transceiver and the clock of the receiving transceiver by using the slope of said straight line;
  adjusting the frequency of the receiving transceiver's clock according to the calculated frequency offset.

2. The method according to claim 1, wherein the step of forming said energy matrix comprises the step of introducing in two subsequent entries of a column of said energy matrix, two subsequent energy measurements obtained by sampling the received signal.

3. The method according to claim 1, wherein the step of forming said energy matrix comprises the step of introducing in two subsequent entries of a row of said energy matrix, two energy measurements obtained by sampling the received signal at two times differing by a multiple of said first duration $T_f^{pre}$.

4. The method according to claim 1, wherein the step of determining from said energy matrix a straight line connecting a plurality of points of maximum of energy comprises the step of using one of:
    a maximum likelihood estimation technique;
    a least square technique;
    a general fitting technique;
    a line detection technique used in image processing.

5. The method according to claim 4, wherein the step of determining from said energy matrix a straight line connecting a plurality of points of maximum of energy uses a line detection technique and wherein said line detection technique comprises the step of:
    transforming lines of the energy matrix in points of a Radon space, wherein the coordinates $(\rho,\theta)$ of a point in said Radon space corresponds to a line of slope $\theta$ and of distance to origin $\rho$ in said energy matrix;
    integrating the energy along each line of the energy matrix and attributing an energy value corresponding to the integrated energy to the corresponding point of the Radon space and obtaining a Radon matrix;
    determining at least one point of maximal energy value in the Radon matrix;
    determining a column of the Radon matrix corresponding to the estimated clock drift and containing at least one of said at least one point of maximal energy value.

6. The method according to claim 5, wherein the values of the Radon matrix are convolved with a vector of predetermined length.

7. The method according to claim 5, wherein the step of determining said at least one point of maximal value in the Radon space comprises a step of squaring the intensity values of the Radon matrix.

8. The method according to claim 5, wherein the integration of the energy is performed while assuming that the energy is distributed in each cell of the energy matrix according to a specific distribution.

9. The method according to claim 8, wherein said specific distribution corresponds to one of:
    all the energy in one cell is in the center of the cell of the energy matrix;
    the energy is uniformly distributed in the cell of the energy matrix; or
    there is a Gaussian distribution of the energy in the cell of the energy matrix.

10. The method according to claim 5, wherein energy measurements below a threshold are dismissed prior to calculating the Radon transform.

11. The method according to claim 5, wherein energy measurements above a threshold are dismissed prior to calculating the Radon transform.

12. The method according to claim 5, wherein several energy measurements are combined using a moving average operation prior to calculating the Radon transform.

13. The method according to claim 12, wherein the moving average operation uses the median.

14. The method according to claim 12, wherein energy measurements above a threshold are set to a common value prior to averaging.

15. The method according to claim 5, wherein the column of the Radon matrix corresponding to the estimated clock drift is used to determine an estimate of the channel energy-delay profile.

16. The method according to claim 5, wherein the point of the Radon matrix with maximal value is used as a coarse estimate of the time of arrival of the signal.

17. The method according to claim 16, wherein the estimated time of arrival is refined by a search-back procedure starting from the coarse estimate of the time of arrival.

18. A method for estimating and correcting a frequency offset between a local clock of a receiving transceiver and a remote clock of a corresponding emitting transceiver, said receiving transceiver receiving from the emitting transceiver electromagnetic signals that lack a continuous sinusoidal carrier, said method comprising the steps of:
    receiving by said receiving transceiver, a signal emitted by the emitting transceiver, said signal lacking the continuous sinusoidal carrier and being formed of at least one symbol, each symbol being emitted within a time frame having a first duration $T_f^{pre}$;
    sampling the said received signal by taking for each frame a set of energy measurements of said received signal;
    defining an initial Radon matrix;
    for each energy measurement, calculating a contribution of this energy measurement to an entry of the Radon matrix;
    updating the Radon matrix by adding said contribution;
    determining at least one point of maximal energy value in the Radon space;
    determining a column of the Radon matrix containing at least one of said at least one point of maximal energy value;
    calculating a frequency offset between the clock of the emitting transceiver and the clock of the receiving transceiver by using the determined column of the Radon matrix;
    adjusting the frequency of the receiving transceiver's clock according to the calculated frequency offset.

19. The method according to claim 18, wherein the values of the Radon space are convolved with a vector of predetermined length.

20. The method according to claim 19, wherein the step of determining said at least one point of maximal value in the Radon space comprises a step of squaring the intensity values of the Radon matrix.

21. The method according to claim 18, wherein the integration of the energy is performed while assuming that the energy is distributed in each cell of the energy matrix according to a specific distribution.

22. The method according to claim 21, wherein said specific distribution corresponds to one of:
    all the energy in one cell is in the center of the cell of the energy matrix;
    the energy is uniformly distributed in the cell of the energy matrix; or
    there is a Gaussian distribution of the energy in the cell of the energy matrix.

23. The method according to claim 18, wherein energy measurement below a threshold are dismissed prior to calculating the Radon transform.

24. The method according to claim 18, wherein energy measurement above a threshold are dismissed prior to calculating the Radon transform.

25. The method according to claim 18, wherein several energy measurement are combined using a moving average operation prior to calculating the Radon transform.

26. The method according to claim 25, wherein the moving average operation uses the median.

27. The method according to claim 25, wherein energy measurement above a threshold are set to a common value prior to averaging.

28. The method according to claim 18, wherein the column of the Radon matrix corresponding to the estimated clock drift is used to determine an estimate of the channel energy-delay profile.

29. The method according to claim 18, wherein the point of the Radon transform with maximal value is used as a coarse estimate of the time of arrival of the signal.

30. The method according to claim 29, wherein the estimated time of arrival is refined by a search-back procedure starting from the coarse estimate of the time of arrival.

31. A receiver comprising:
an energy detection receiver structure;
a memory; and
a processor connected to the memory,
the processor being configured to perform:
receiving by said receiving transceiver, a signal emitted by the emitting transceiver, said signal lacking a continuous sinusoidal carrier and being formed of at least one symbol, each symbol being emitted within a time frame having a first duration $T_f^{pre}$;
sampling the said receiver signal by taking for each frame a set of energy measurements of said received signal;
forming a matrix representative of said energy measurements;
determining from said energy matrix, points of maximum energy within each of said time frames:
determining a straight line connecting a plurality of said points of maximum energy;
determining a slope of said straight line;
calculating a frequency offset between the clock of the emitting transceiver and the clock of the receiving transceiver by using the slope of said straight line;
adjusting the frequency of the receiving transceriver's clock according to the calculated frequency offset.

32. A receiver comprising:
an energy detection receiver structure;
a memory; and
a processor connected to the memory, the processor being configured to perform;
receiving by said receiving transceiver, a signal emitted by the emitting transceiver, said signal lacking a continuous sinusoidal carrier and being formed of at least one symbol, each symbol being emitted within a time frame having a first duration $T_f^{pre}$;
sampling the said received signal by taking for each frame a set of energy measurements of said received signal;
defining an initial Radon matrix;
for each energy measurement, calculating a contribution of this energy measurement to an entry of the Radon matrix;
updating the Radon matrix by adding said contribution;
determining at least one point of maximal energy value in the Radon space;
determining a column of the Radon matrix containing at least on of the said at least one point of maximal energy value;
calculating a frequency offset between the clock of the emitting transceiver and the clock of the receiving transceiver by using the determined column of the Radon matrix;
adjusting the frequency of the receiving transceiver's clock according to the calculated frequency offset.

* * * * *